United States Patent [19]
Koski

[11] Patent Number: 5,986,449
[45] Date of Patent: Nov. 16, 1999

[54] SELF-CONTAINED LIQUID LEVEL DETECTION APPARATUS WITH SUBSTANTIALLY CONSTANT CROSS-SECTION OUTER TUBE

[75] Inventor: Richard D. Koski, Troy, Mich.

[73] Assignee: Patroit Sensors and Controls Corporation, Clawson, Mich.

[21] Appl. No.: 08/848,891

[22] Filed: May 1, 1997

[51] Int. Cl.⁶ .............................. G01B 7/14; G01B 7/26; G01F 23/30; H03H 9/22

[52] U.S. Cl. .............................. 324/207.13; 324/207.24; 73/290 V; 73/313

[58] Field of Search .................. 324/207.13, 207.24, 324/207.12, 226; 333/148; 73/290 V, 313, 314

[56] References Cited

U.S. PATENT DOCUMENTS

| | | |
|---|---|---|
| 4,678,993 | 7/1987 | Vinnemann et al. . |
| 4,939,457 | 7/1990 | Tellerman . |
| 4,943,773 | 7/1990 | Koski et al. . |
| 4,958,332 | 9/1990 | Tellerman . |
| 5,017,867 | 5/1991 | Dumais et al. . |
| 5,050,430 | 9/1991 | Begin et al. . |
| 5,076,100 | 12/1991 | Hunter et al. . |
| 5,136,884 | 8/1992 | Lovett . |
| 5,196,791 | 3/1993 | Dumais . |
| 5,258,707 | 11/1993 | Begin et al. . |
| 5,274,328 | 12/1993 | Begin et al. . |
| 5,313,160 | 5/1994 | Gloden et al. . |
| 5,406,200 | 4/1995 | Begin et al. . |
| 5,412,316 | 5/1995 | Dumais et al. . |
| 5,473,245 | 12/1995 | Silvus, Jr. et al. . |
| 5,680,041 | 10/1997 | Begin ................. 324/207.13 |

*Primary Examiner*—Walter E. Snow
*Attorney, Agent, or Firm*—Young & Basile, P.C.

[57] ABSTRACT

A liquid level detection apparatus includes an outer tube of substantially constant diameter. A magnetostrictive wire is supported within the outer tube. An electrical circuit is mounted within the outer tube and is electrically connected to a pickup coupled to the magnetostrictive wire.

19 Claims, 3 Drawing Sheets

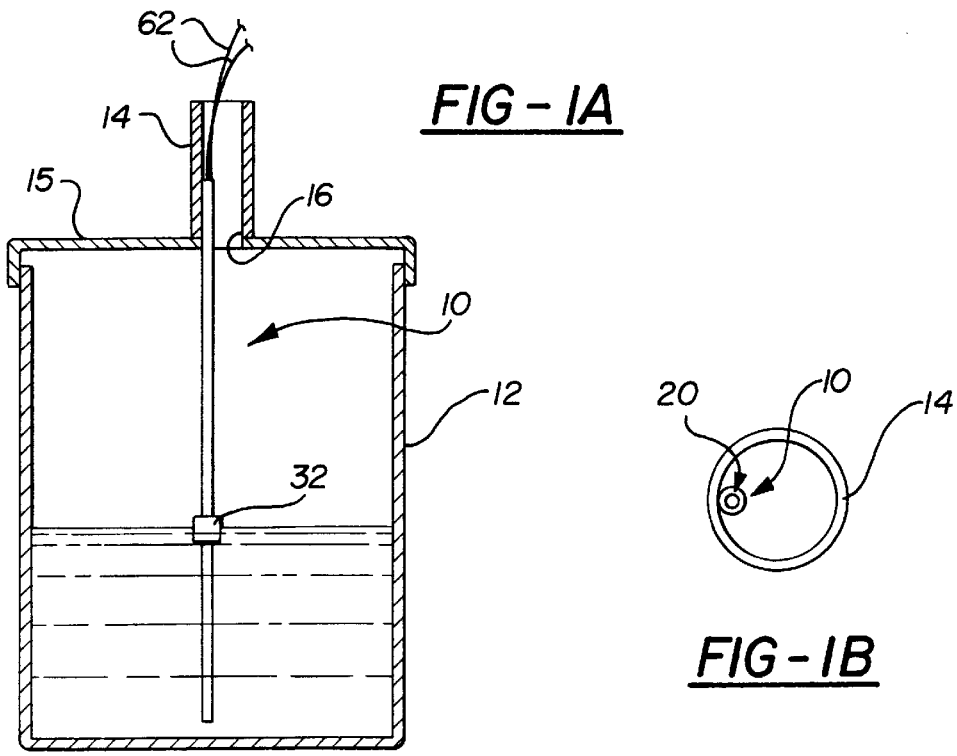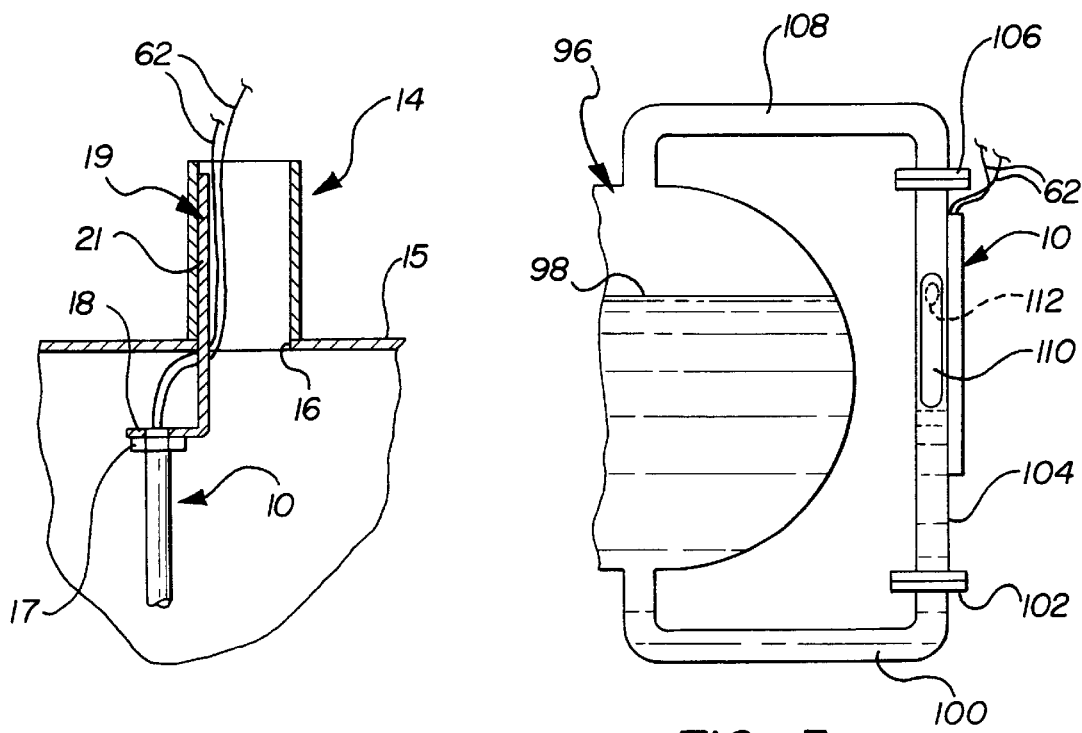

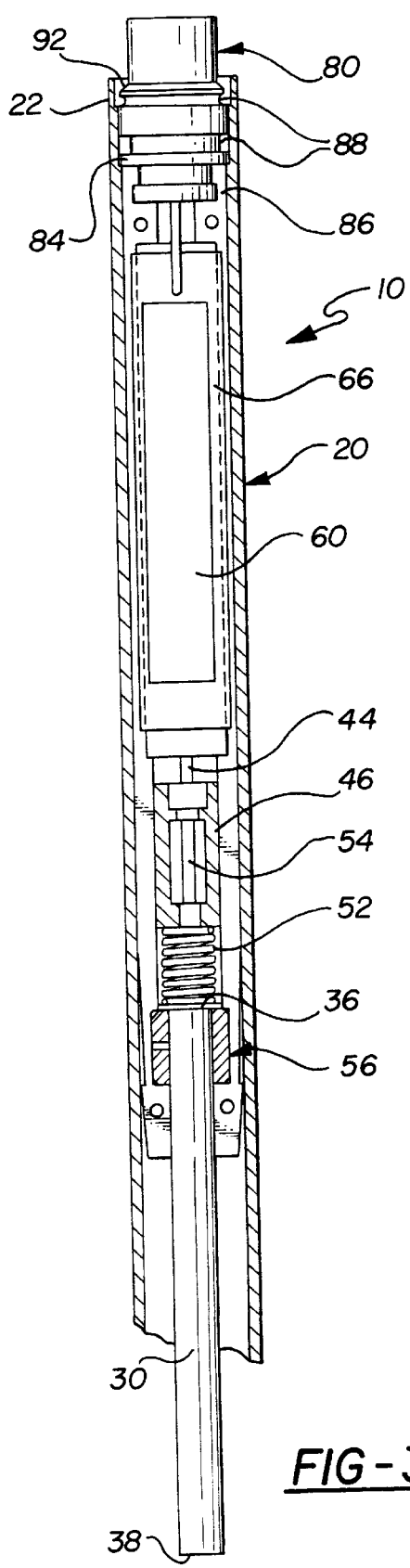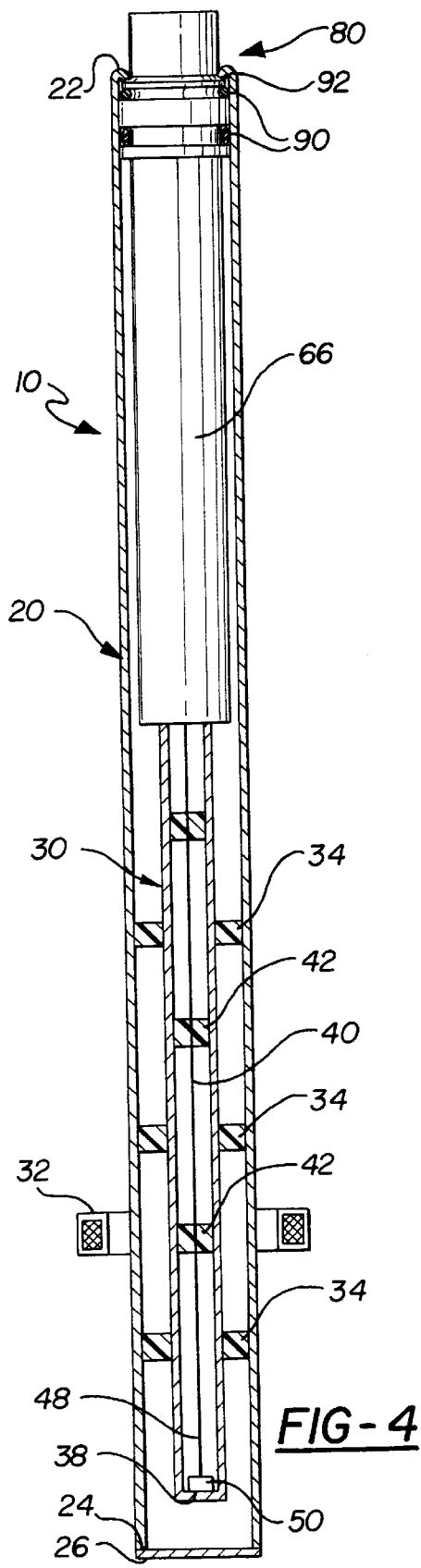

SELF-CONTAINED LIQUID LEVEL DETECTION APPARATUS WITH SUBSTANTIALLY CONSTANT CROSS-SECTION OUTER TUBE

BACKGROUND OF THE INVENTION

Field of the Invention

The present relates, in general, to magnetostrictive position transducers.

The phenomenon of magnetostriction has been widely employed in linear distance and position measuring devices. A magnet located near or around a magnetostrictive wire marks the location to be measured. Such devices can operate with either mechanical or electrical excitation. When an acoustical/mechanical strain propagating along the wire reaches the area of influence of the magnet, an electrical signal is generated in the wire. Conversely, when an electrical signal propagating along the wire reaches the area of influence of the magnet, a torsional strain is generated in the wire.

Such linear position detectors using a magnet mounted in a float have been utilized as liquid level detectors to provide an indication of a level of liquid within a tank, such as an underground tank. The position of the magnet, and hence, the liquid level, is determined as a function of the time required for a torsional disturbance to propagate from one end of the wire through the area of influence of the magnet, in the case of mechanical excitation, or from the position of the magnet to a sensing apparatus located at one end of the wire in the case of electrical excitation.

Other types of magnetostrictive position measuring devices utilize a reflective termination at the foot end of the magnetostrictive wire. Such devices measure the difference between the propagation times of a pulse from the magnet position to the foot of the wire and reflected back to the head of the device and a pulse traveling on the wire directly from the magnet to the head.

As shown in U.S. Pat. Nos. 4,839,590; 5,017,867; 5,050,430; and 5,253,521, all of which are assigned to the assignee of the present invention, such magnetostrictive devices include an elongated, small diameter tube, typically made of stainless steel, on which a movable magnet is mounted for providing an indication of a liquid level. An enlarged head and cap are mounted on one end of the tube, typically above the liquid level and enclose electronic components, such as terminal connections and a signal conditioning circuit used to supply or output signals to and from the magnetostrictive wire in the tube. As shown in these prior art patents, the head has a considerably larger diameter than the diameter of the elongated tube extending through the tank.

Fluid tanks, such as underground gasoline or fuel tanks, are typically provided with one or more risers or hollow conduits mounted on a top surface of the tank and extending upward to an upper end which is located at ground level. One riser is usually employed for filling the tank and typically will have a diameter of approximately four inches. A second smaller riser, such as a two inch diameter riser, may also be provided as a vent.

Existing tanks which are buried underground and which were not provided with the expectation of using liquid level detection within the tank, typically will not have a large riser or a riser dedicated to liquid level detection. Thus, where it is desirable to provide liquid level detection to such existing underground tanks, previously devised magnetostrictive positioning measuring devices having an enlarged head cannot fit within the fill nozzle of the existing riser on such tanks or will completely fill the interior of the riser thereby preventing the insertion of a fuel nozzle into the riser. The only recourse in such situations is to dig up the existing tank and add a riser specifically for a liquid level detection apparatus.

Thus, it would be desirable to provide a liquid level or position detection apparatus which can be easily mounted in tanks or vessels having small diameter risers. It would also be desirable to provide a liquid level or position detection apparatus which can be easily mounted in existing underground tanks without the need for digging up the tank. It would also be desirable to provide a liquid level detection apparatus in which all of the components of the apparatus are contained within a single, small diameter tube which is extendable into the tank. It would also be desirable to provide a liquid level or position detection apparatus which can be easily mounted on all configurations of sight glasses mounted externally on liquid tanks.

SUMMARY OF THE INVENTION

The present invention is a self-contained liquid level detection apparatus which includes a magnetostrictive waveguide extending through a measurement field, with at least one magnet surrounding the waveguide and providing disturbances therein. The liquid level detection apparatus includes an outer magnetic transmissive tube of substantially constant diameter surrounding a magnetostrictive wire. A pickup means, coupled to the magnetostrictive wire, outputs signals propagating along the wire. A circuit means disposed in the outer tube couples electrical signals to the magnetostrictive wire and the pickup means and transmits electric signals from the magnetostrictive wire and the pickup means. Output conductors extend from the circuit means through a first end of the outer housing.

A fitting is mounted in a first end of the outer tube and contains a through bore for passage of the conductors from the interior of the outer tube to an external controller or circuit.

A housing, preferably formed of first and second separable portions, is optionally employed to support the circuit means in the outer tube. Means are also provided for fixedly mounting one end of an optional inner tube within the housing. The mounting means preferably comprises a metallic collar mounted externally on the inner tube which engages a mating seat formed in the housing.

A pickup carrier is optionally mounted in the housing and supports the pickup means. Biasing means are disposed between the carrier and the inner tube for exerting an elongation force on the inner tube to maintain the elongated magnetostrictive in a linear, stretched configuration.

The self-contained liquid level detection apparatus of the present invention provides several advantages over previously devised magnetostrictive liquid level detection apparatus useable in detecting liquid levels in large tanks or vessels, such as underground tanks. The liquid level detection apparatus is contained completely within the outer tube. This provides an overall small diameter outer tube thereby enabling the outer tube through which the signal carrying conductors pass to be mounted within a small portion of a riser without consuming all of the interior space within the riser. This enables liquid level detection capability to be added to an existing buried tank which was not previously provided with liquid level detection capability since the small diameter outer tube which carries all of the operative components of the liquid level detection apparatus of the present invention can be easily inserted through an existing riser in the buried tank. Since the single diameter outer tube has a small outer diameter, the liquid level detection apparatus consumes only a small portion of the available space within the riser thereby enabling the riser to continue to function in a normal manner.

The inventive liquid level detection apparatus is easy to assemble while still providing all of the advantages and functions of a magnetostrictive liquid level or position measurement device. The small diameter outer tube of the liquid level detection apparatus of the present invention can also be mounted on an external sight glass to provide an indication of liquid level in a tank regardless of the mounting flange configuration of the sight glass.

BRIEF DESCRIPTION OF THE DRAWING

The various features, advantages and other uses of the present invention will become more apparent by referring to the following detailed description and drawing in which:

FIG. 1A is a cutaway, side elevational view of a liquid level detection apparatus constructed in accordance with the teaching of the present invention;

FIG. 1B is a plan view of the riser portion of the tank incorporating a liquid level detection apparatus according to the present invention as shown in FIG. 1;

FIG. 1C is an enlarged, partial cross-sectional view showing an alternate mounting arrangement for the liquid level detection apparatus of the present invention in a tank with a riser;

FIG. 3 is an enlarged, partially cross-sectioned, assembled view of the apparatus shown in FIG. 2;

FIG. 4 is a partially broken away, side elevational view of the complete liquid level detection apparatus shown in FIGS. 1 and 3; and FIG. 5 is a side elevational view showing the liquid level detection apparatus of FIG. 1 mounted on liquid tank sight glass.

DESCRIPTION OF THE PREFERRED EMBODIMENTS

Figure 2:
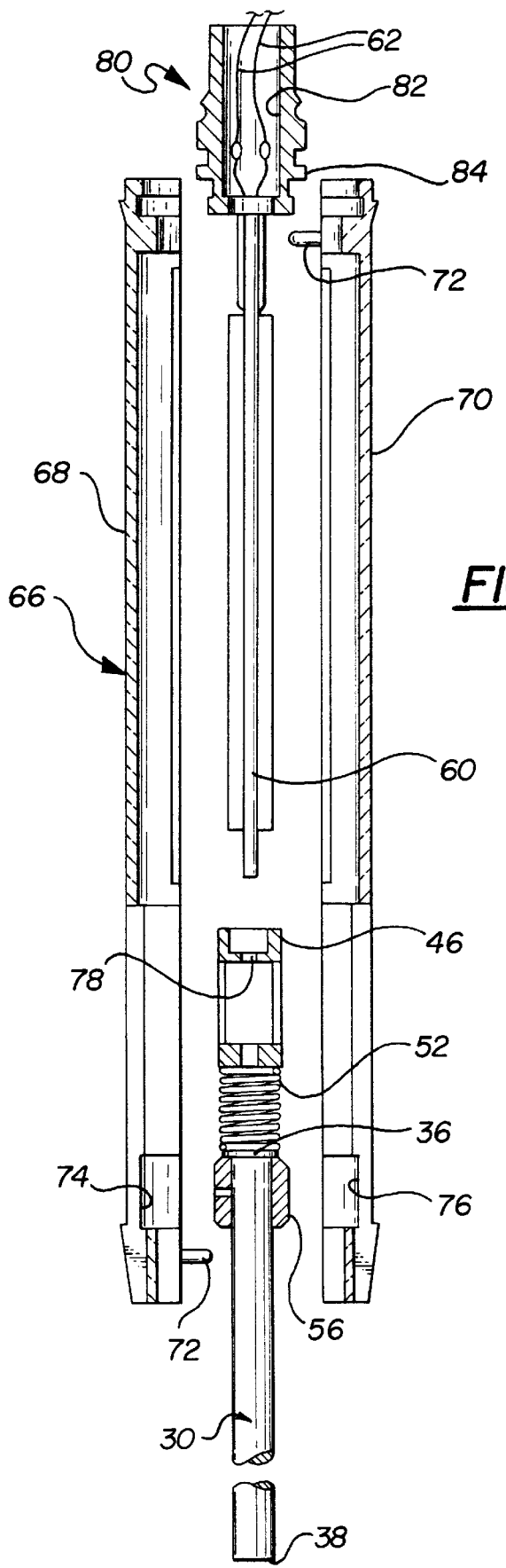
FIG. 2 is an enlarged, partially cross-sectioned, exploded, view of the apparatus shown in FIG. 1.

Referring now to the drawing, and to FIGS. 1A–4 in particular, there is depicted a liquid level detection apparatus 10 constructed in accordance with the teachings of the present invention. The detection apparatus 10 is depicted as being mounted in a fixed relationship within a liquid containing tank 12, such as a gasoline tank, the liquid level in which may vary from empty to a full condition. In FIG. 1A, the tank 12 is illustrated as being slightly less than half full by way of example only. A riser 14 is mounted on the top cover of the tank 12 and extends upward generally to ground level. The riser 14 provides access to the interior of the tank 12 for the supply of liquid to the tank 12 and/or the discharge of liquid from the tank 12 through an aperture 16 located within the top cover 15 of the tank 12. Although not shown in FIG. 1A, a filler liner including a check valve and a fuel nozzle connection fitting may be mounted within the riser 14.

The liquid level detection apparatus 10 of the present invention, in the embodiment shown in FIGS. 1A and 1B, extends through the aperture 16 in the top of the tank 12. Alternately, as shown in FIG. 1C, the liquid level detection apparatus 10 is mounted by means of a clamp 17 or other fastener arrangement, to one leg 18 of bracket 19. The bracket 19 also includes a second leg 21 orientated generally perpendicular to the first leg 18. The second leg 21 is designed to abut and be fixedly attached to the riser 14 as shown in FIG. 1C. In this manner, the top end of the liquid level detection apparatus 10 is spaced below, but in close proximity to the top cover 15 of the tank 12. The liquid level detection apparatus 10, as shown in FIG. 4, includes an outer conduit or tube 20 of substantially constant diameter between a first end 22 and an opposed second end 24. The second end 24 is closed by an end cap 26 which is attached to the tube 20 by welding, etc. The outer tube 20 is provided in any required length between the first and second ends 22 and 24 depending upon the overall size of the tank 12 in which the liquid level detection apparatus 10 is employed. The outer tube 20 is formed of any non-magnetic material so as to be magnetically transmissive. Brass, stainless steel and even plastic may be employed to form the outer tube 20.

An optional inner tube 30 is disposed within the outer tube 20 and extends over a substantial portion of the length of the outer tube 20, at least through a measurement area determined by the range of movement of a magnet 32 along the outer surface of the outer tube 20. A plurality of annular spacers 34 are positioned along the inner surface of the outer tube 20 to center and support the inner tube 30 within the outer tube 20. The spacers 34 are formed of a non-magnetic material, such as plastic, brass, etc.

As shown in FIGS. 2 and 3, the inner tube 30 has an open first end 36 and an opposed, closed second end 38. A thin magnetostrictive wire 40 is disposed within the inner tube 30 and held therein by means of a plurality of annular spacers 42 which are formed of a suitable magnetic transmissive material, such as plastic, brass, etc.

The magnetostrictive wire 40 has a first end 44 which is fixedly mounted on a carrier or substrate 46 by way of example only. A second end 48 of the wire 40 is connected to the second end 38 of the inner tube 30 by means of a fixed connection or shackel 50 shown in FIG. 4. Reflective terminations, such as the reflective termination shown in U.S. Pat. Nos. 5,253,521 and 5,017,867, may also be employed to connect the second end 48 of the wire 40 to the second end 38 of the inner tube 30. The magnetostrictive wire 40 is preferably formed of nickel/iron alloy. A material known as Nispan C is suitable for use as the magnetostrictive wire 40.

A biasing means or spring 52 is interposed between the first end 38 of the inner tube 30 and one end of the carrier 46 to maintain the wire 40 in a straight, elongated form within the inner tube 30.

A pickup 54 is mounted on the carrier 46 and surrounds or is disposed in contact with the wire 40. The pickup or transducer 54 may be any suitable pickup or transducer employed in magnetostrictive liquid level detection apparatus. As described in U.S. Pat. No. 5,050,430, a small rectangular piezoelectric crystal can be clamped to one end of the magnetostrictive wire 40. The piezoelectric crystal operates as a transducer such that when a voltage is applied across the faces of the crystal by means of signal wires attached to the crystal, the crystal expands longitudinally or in a direction transverse to the length of the wire 40. This imparts a localized torsional strain on the wire 40 which propagates in both directions along the wire 40. Alternately, a coil may be mounted on the carrier 46 and concentrically surrounds the wire 40. Two conductors extend from the pickup 54. In addition, a single conductor, not shown, is connected to the first end 44 of the wire 40. A second or return conductor is connected to the inner tube 30 which acts as a return path. By example only, the return conductor is connected to an electrically conductive, non-magnetic collar 56, shown in FIGS. 2 and 3, which is fixedly mounted, such as by soldering, to the first end 36 of the inner tube 30. Preferably, the collar 56 is formed of brass or other non-magnetic material.

The conductors extending from the pickup 54, the wire 40 and the return wire are connected to a circuit means mounted on a circuit board 60. Terminal pads are provided on the circuit board and receive solder connections to the various conductors. Two conductors extend from an opposite end of the circuit board 60 to a glass filled seal connections. Two external conductors 62 pass outwardly from one end of the outer tube 20 and are connected to a remote controller or circuit. The two conductors 62 form a two-wire loop which provides a current output when a voltage is applied thereto, which indicates the position of the magnet 32 along the length of the outer tube 20. Alternately, the two conductors 62 may be used to provide an output pulse signal indicative of the propagation time of the induced signal along the magnetostrictive wire 40.

In one example of the present invention, the circuit means or board 60 is contained within a housing 66, shown generally in FIG. 4, and in greater detail in FIGS. 2 and 3. The housing 66 is formed of two matingly interconnectable and separable halves or portions 68 and 70. The first and second portions 68 and 70 are generally symmetrical in configuration and include pins 72 at opposite ends which engage apertures formed in the opposite ends of opposed first or second portions 68 and 70 for releasably connecting the first and second portions 66 and 68 together to form a complete housing surrounding the circuit means or board 60. The first and second housing portions 68 and 70 are each formed with annular recessed portions 74 and 76 which form an annular seat for the brass collar 56. Since the brass collar 56 is fixedly mounted on one end of the inner tube 30, this arrangement provides a fixed mounting of the first end 36 of the inner tube 20 within the housing 66. Further, one end of the circuit board 60 seats within an aperture or slot 78 in one end of the carrier 46 to fixedly couple the circuit board 60 to the carrier 46.

A fitting 80 is mountable through the first end 22 of the outer tube 20 as shown in FIGS. 2–4. The fitting 80 includes a through bore 82 which receives the two conductors 62 therethrough prior to further receiving a potting or sealing compound, not shown, which completely fills the bore 82. An annular end surface 84 is formed at one end of the fitting 80 and seats in a shoulder 86 spaced from the first end 22 of the outer tube 20 to axially position the fitting 80 relative to the outer tube 20. Annular recesses 88 are formed externally on the fitting 80 and receive seal members, such as O-rings 90, shown in FIG. 4, to sealingly couple the fitting 80 to the outer tube 20. As also shown in FIG. 4, once the fitting 80 has been positioned within the first end 22 of the outer tube 20, the first end 22 of the outer tube 20 is rolled or bent radially inward into engagement an annular flange 92 at one end of the fitting 80 to fixedly mount the fitting 80 in the first end 22 of the outer tube 20.

In assembling the liquid level positioning apparatus 10 of the present invention, the circuit board 60, the carrier 46, the spring 52, the collar 56 and the first end 36 of the inner tube 20 are axially arranged as shown in FIG. 2 in one of the first and second housing portions 68 and 70. The wires extending to and from the collar 56, the pickup 54 and the magnetostrictive wire 40 are connected to the terminal pads on the circuit board 60. Conductors are also connected to terminal connections on the other end of the circuit board 60 through the glass filled seals. The external conductors are connected to the glass filled seals and are passed through the bore 82 in the fitting 80 when the fitting 80 is brought into proximity with the circuit board 60. The first and second housing portions 68 and 70 are then snapped into fixed engagement to maintain the fitting 80, the circuit board 60, the carrier 46, the spring 52 and the first end 36 of the inner tube 20 in the illustrated axial arrangement while maintaining an elongation force on the magnetostrictive wire 60.

The assembly is then inserted into the first end 22 of the outer tube 20 and the first end 22 of the outer tube 20 bent inward into engagement with the flange 92 on the end fitting 80. This supports the entire inner tube 30 and the housing 60 through the aperture 16 from the fitting 80. The entire apparatus 10 may then be mounted in the tank 12 shown in FIG. 1.

It will be understood that in a simplest form, the liquid level detection apparatus 10 of the present invention may include only the outer tube 20, the magnetostrictive wire 40 and the circuit 60 on which the pickup 54 is mounted. The return wire extends from one end of the magnetostrictive wire 40 to the circuit 60. The circuit 60 can be fixedly mounted at one end of the outer tube 20 so as to apply tensile force to the magnetostrictive wire 40.

FIG. 5 depicts another application of the liquid level detection apparatus 10 of the present invention. In this embodiment, a liquid vessel or tank 96, typically one employed to process fluid in an industrial process contains liquid movable at various levels 98. A lower conduit 100 extends from the bottom or near the bottom of the tank 96 and forms a fluid flow path through mounting flanges 102 to a standpipe or stand glass 104. Mounting flanges 106 provide a connection for an upper conduit 108 to the upper portion of the tank 96. This type of standpipe is well known and includes a float 110 in which a magnet 112 is contained. Since the standpipe 104 is disposed in fluid communication with the liquid within the tank 96, the float 110 floats on the surface or liquid level in the standpipe 104 which corresponds to the liquid level 98 in the tank 96.

In this application, the liquid level detecting apparatus as described above and shown in FIGS. 1A and 4, is fixedly mounted on an exterior surface of the standpipe 104 between the mounting flanges 102 and 106 and extends over the range of movement of the magnet 112 in the float 110. Since the apparatus 10 is wholly contained within the interior of the outer pipe 30, the apparatus 10 may be mounted immediately adjacent to or directly on the exterior surface of the standpipe 104 without special mounting brackets or arrangements previously required by the mounting flanges 102 and 106. This enables the liquid level detecting apparatus 10 of the present invention to be easily employed in a standpipe tank application regardless of the particular standpipe mounting flange arrangement.

In summary, there has been disclosed a unique liquid level detecting apparatus in which all of the operative components of the apparatus are contained within a generally constant diameter outer pipe having a small diameter which is readily mountable in existing tank apertures.

What is claimed is:

1. A position detector apparatus having a magnetostrictive waveguide extending through a measurement field with at least one magnet moveable through the measurement field for providing disturbances in the magnetostrictive waveguide, the apparatus comprising:

an outer magnetic transmissive tube having a substantially linear sidewall extending between opposed first and second ends;

a magnetostrictive wire fixedly mounted in and completely contained within the outer tube;

pickup means, disposed in the outer tube and coupled to the magnetostrictive wire, for outputing signals propagating along the wire;

circuit means, disposed completely within the outer tube, for coupling electrical signals to the magnetostrictive wire and the pickup means and for transmitting electric signals from the magnetostrictive wire and the pickup means.

2. The apparatus of claim 1 further comprising:

output conductors extending from the circuit means through the first end of the outer tube.

3. The apparatus of claim 2 further comprising:

a fitting fixedly mounted in the first end of the outer housing, the output conductors passing through the fitting.

4. The apparatus of claim 1 further comprising:

a pickup carrier supporting the pickup means, the pickup carrier disposed in registry with the circuit means.

5. The apparatus of claim 1 further comprising:

a housing mounted within the outer tube and supporting the circuit means.

6. The apparatus of claim 5 wherein the housing comprises:

first and second separable housing portions; and means for mounting the circuit means in at least one of the first and second housing portions.

7. The apparatus of claim 5 further comprising:

an inner magnetic transmissive tube disposed within the outer tube, the inner tube surrounding the magnetostrictive wire; and means for fixedly mounting a first end of the inner tube in the housing.

8. The apparatus of claim 7 wherein the mounting means comprises:

a collar mounted on one end of the inner tube;

means, formed in the first and second housing portions, for fixedly receiving the collar in the housing.

9. The apparatus of claim 8 further comprising:

a fitting fixedly mounted in the first end of the outer housing, the output conductors passing through the fitting.

10. The apparatus of claim 9 further comprising:

a pickup carrier mountable in the housing and supporting the pickup, the pickup carrier disposed in registry with the circuit means.

11. The apparatus of claim 10 further comprising:

a fitting fixedly mounted in the first end of the outer housing, the output conductors passing through the fitting.

12. The apparatus of claim 11 further comprising:

biasing means disposed between the carrier and the inner tube, for tensioning the magnetostrictive wire in the inner tube.

13. The apparatus of claim 1 wherein:

the outer tube has a substantially constant cross section between the opposed first and second ends.

14. A position detector apparatus having a magnetostrictive waveguide extending through a measurement field with at least one magnet movable through the measurement field for providing disturbances in the magnetostrictive waveguide, the apparatus comprising:

an outer magnetic transmissive tube, the outer tube has a linear, substantially constant cross-section between opposed first and second ends;

a magnetostrictive wire fixedly mounted within the outer tube;

pickup means, disposed completely within the outer tube and coupled to the magnetostrictive wire, for outputing signals propagating along the wire;

circuit means, disposed completely within the outer tube, for coupling electrical signals to the magnetostrictive wire and the pickup means and for transmitting electric signals from the magnetostrictive wire and the pickup means; and output conductors extending from the circuit means through the first end of the outer tube.

15. The apparatus of claim 14 further comprising:

a housing mounted within the outer tube and supporting the circuit means.

16. The apparatus of claim 14 further comprising:

an inner magnetic transmissive tube disposed within the outer tube, the inner tube surrounding the magnetostrictive wire; and means for fixedly mounting a first end of the inner tube in the housing.

17. The position detection apparatus of claim 1 wherein:

the magnetostrictive wire is substantially concentric with the outer tube over substantially the entire length of the magnetostrictive wire.

18. The apparatus of claim 1 further comprising:

a vessel having upper and lower conduits extending therefrom the upper and lower conduits terminating at mounting flanges engageable with mounting flanges on opposed ends of a stand pipe disposed in a position such that the level of liquid in the stand pipe corresponds to the level of liquid in the vessel;

magnet means floating on the surface of the liquid in the stand pipe; and the outer tube mounted directly to the stand pipe between the mounting flanges on the stand pipe.

19. The apparatus of claim 18 wherein:

both of the first and second ends of the outer tube are parallel with the stand pipe.

\* \* \* \* \*